(12) United States Patent
Johnson

(10) Patent No.: US 6,981,365 B1
(45) Date of Patent: Jan. 3, 2006

(54) SUPERSONIC REVOLVING NOZZLE

(75) Inventor: Curtis William Johnson, Carson City, NV (US)

(73) Assignee: Sierra Engineering Incorporated, Carson City, NV (US)

(*) Notice: Subject to any disclaimer, the term of this patent is extended or adjusted under 35 U.S.C. 154(b) by 0 days.

(21) Appl. No.: 10/331,176

(22) Filed: Dec. 26, 2002

Related U.S. Application Data

(60) Provisional application No. 60/344,749, filed on Dec. 28, 2001.

(51) Int. Cl.
*F02K 1/06* (2006.01)
*F02K 1/78* (2006.01)
*F02K 7/02* (2006.01)
*F02K 7/06* (2006.01)

(52) U.S. Cl. .................. 60/247; 60/39.38; 60/39.39; 60/771; 60/39.78

(58) Field of Classification Search ............. 60/224, 60/244, 247, 249, 263, 39.38, 39.39, 39.76, 60/39.78, 770, 771; 239/265.25, 265.27
See application file for complete search history.

(56) References Cited

U.S. PATENT DOCUMENTS

| | | | | |
|---|---|---|---|---|
| 2,412,173 A | * | 12/1946 | Pope | 60/771 |
| 2,611,317 A | * | 9/1952 | Africano | 60/771 |
| 2,942,412 A | * | 6/1960 | Bollay | 60/247 |
| 3,146,589 A | * | 9/1964 | Twyford | 239/265.25 |
| 3,678,692 A | * | 7/1972 | Heise | 60/247 |
| 4,741,154 A | | 5/1988 | Eidelman | 60/39 |
| 4,994,660 A | * | 2/1991 | Hauer | 60/230 |
| 5,345,758 A | | 9/1994 | Bussing | 60/39.38 |
| 5,353,588 A | * | 10/1994 | Richard | 60/39.38 |
| 5,511,376 A | * | 4/1996 | Barcza | 60/230 |
| 5,513,489 A | * | 5/1996 | Bussing | 60/39.38 |
| 5,694,768 A | * | 12/1997 | Johnson et al. | 60/226.3 |
| 5,775,105 A | | 7/1998 | Zinsmeyer | 60/597 |
| 5,873,240 A | * | 2/1999 | Bussing et al. | 60/247 |
| 5,901,550 A | * | 5/1999 | Bussing et al. | 60/39.38 |
| 6,003,301 A | * | 12/1999 | Bratkovich et al. | 60/247 |

OTHER PUBLICATIONS

T. R. Bussing et al., "Practical Implementation of Pulse Detonation Engines", American Institute of Aeronautics and Astronautics, AIAA 97-2748, 1986.

\* cited by examiner

*Primary Examiner*—Ted Kim
(74) *Attorney, Agent, or Firm*—Sierra Patent Group, Ltd.

(57) ABSTRACT

The disclosed device is directed toward a periodic combustion propulsion system. The periodic combustion propulsion system comprises at least one periodic combustion chamber configured to contain periodic combustion and at least one supersonic exhaust nozzle coupled to the at least one periodic combustion chamber. The supersonic exhaust nozzle is configured with a variable exhaust expansion ratio.

10 Claims, 5 Drawing Sheets

SUPERSONIC REVOLVING NOZZLE

CROSS RELATED REFERENCES

This application claims priority to Provisional Patent Application No. 60/344,749 filed on Dec. 28, 2001.

BACKGROUND OF THE INVENTION

The present disclosure relates to supersonic exhaust nozzles for application to periodic combustion engines in which the combustion products are used as the motive fluid.

This disclosure has potential for use within the aerospace industry or other industries. The modern Pulse Detonation Engine (PDE) concept was introduced in 1986 by T. R. Bussing et al. in an American Institute of Aeronautics and Astronautics (AIAA) publication entitled: "Practical Implementation of Pulse Detonation Engines." The concept is widely recognized as a promising option for the propulsion of aerospace vehicles. However, several obstacles face PDE development. Systems need to be developed that can operate with practical propellant combinations. High-speed, light propellant valves, new combustion control systems, system integration components, and efficient inlets and nozzles must be developed.

SUMMARY

The disclosed device is directed toward a periodic combustion propulsion system. The periodic combustion propulsion system comprises at least one periodic combustion chamber configured to contain periodic combustion and at least one supersonic exhaust nozzle coupled to the at least one periodic combustion chamber. The supersonic exhaust nozzle is configured with a variable exhaust expansion ratio.

In another embodiment, the device is directed toward a periodic combustion propulsion system comprising a periodic combustion chamber including a body having an exhaust port configured to release periodic combustion reactions as propulsive fluid. A supersonic exhaust nozzle is coupled to the periodic combustion chamber. The supersonic exhaust nozzle includes an inlet coupled to a flexible side wall and an outlet coupled to the side wall distal from the inlet. The supersonic exhaust nozzle inlet is coupled to the periodic combustion chamber at a location proximate to the exhaust port. The flexible side wall and the outlet have variable dimensions correlated to periodic combustion in the periodic combustion chamber.

In yet another embodiment, the device is directed toward a periodic combustion propulsion system comprising a periodic combustor including a combustion chamber having an exhaust port and an inlet valve. The exhaust port is coupled to a combustor mounting plate. The system also comprises a supersonic exhaust nozzle configured with a variable exhaust expansion ratio. The supersonic exhaust nozzle includes a body having at least one rigid side wall defining an inlet and a discharge opposite to the inlet. The supersonic exhaust nozzle also includes a nozzle mounting plate proximate to the inlet. The nozzle mounting plate is rotatably coupled to the combustor mounting plate, such that the supersonic exhaust nozzle is configured for rotary coupling with the periodic combustor.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

One embodiment of the present invention provides a multi-chamber pulse detonation engine system with a revolving supersonic exhaust nozzle. The revolving nozzle possesses variable contour and cross-sectional area that allows supersonic exhaust gases to optimally or near optimally expand (that is to expand to the ambient pressure as the exhaust discharges the nozzle at the nozzle exit plane) from a firing chamber while accomplishing the same for a chamber that has recently fired. The nozzle position is clocked to the firing of the pulse detonation chambers providing optimal expansion throughout the detonation transient for the exhaust gases leaving every single chamber. The pulse detonation engine may operate using solid, gaseous or liquid propellant mixtures. Furthermore, the present invention is applicable to any engine where the motive fluid is supersonic and the engine operation is cyclical.

Figure 1:
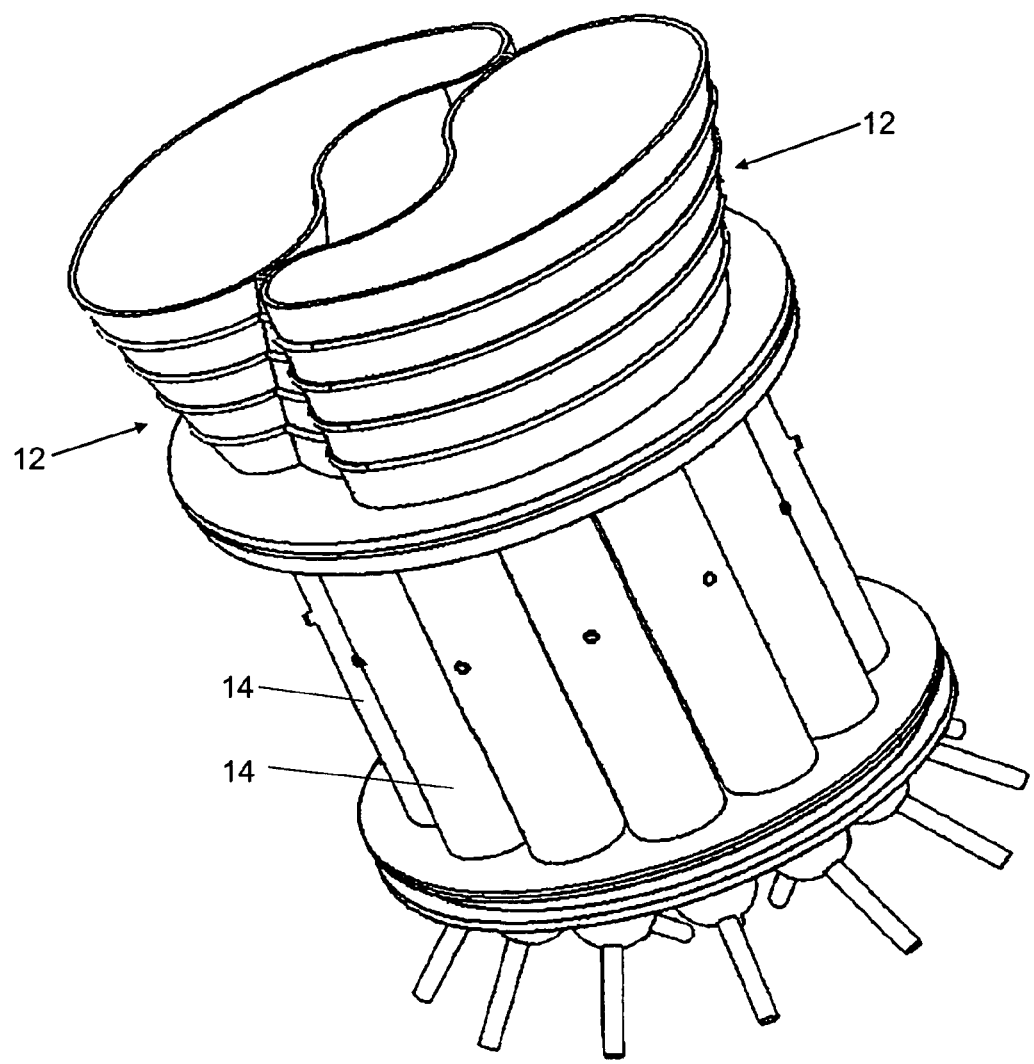
FIG. 1 illustrates an isometric view of an exemplary embodiment of a periodic combustion propulsion system with revolving supersonic exhaust nozzle.

FIG. 1 illustrates an isometric view of an exemplary embodiment of a periodic combustion propulsion system 10 with revolving supersonic exhaust nozzle 12. The periodic combustion propulsion system 10 includes a periodic combustion chamber 14 configured to contain periodic combustion reactions. The periodic combustion chamber 14 is coupled to the supersonic exhaust nozzle 12. In an embodiment, the periodic combustion chamber 14 and the supersonic exhaust nozzle are coupled in a rotary manner (or rotatably coupled) (not shown). There can be one or a plurality of supersonic exhaust nozzles 12. FIG. 1 illustrates a pair of supersonic exhaust nozzles 12. There can be one or a plurality of periodic combustion chambers 14. The supersonic exhaust nozzle 12 is configured with a variable exhaust expansions ratio. The supersonic exhaust nozzle 12 can be formed with a varying nozzle geometry. The varying nozzle geometry is directly correlated to the periodic combustion pressure of the periodic combustion chamber 14.

Figure 2:
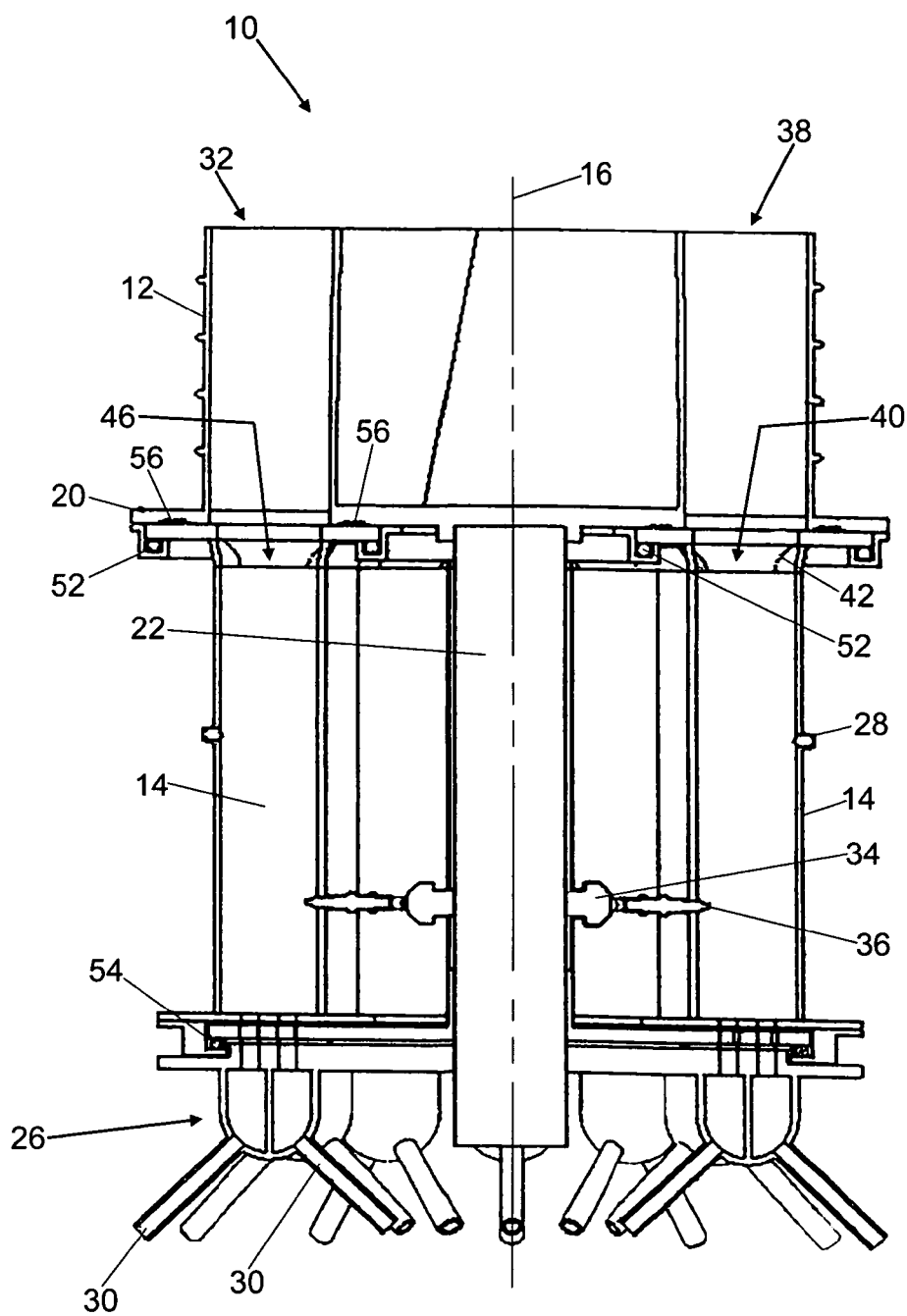
FIG. 2 illustrates an isometric cutaway view of an exemplary multi-chamber periodic combustion propulsion system with revolving supersonic exhaust nozzle.
Figure 3:
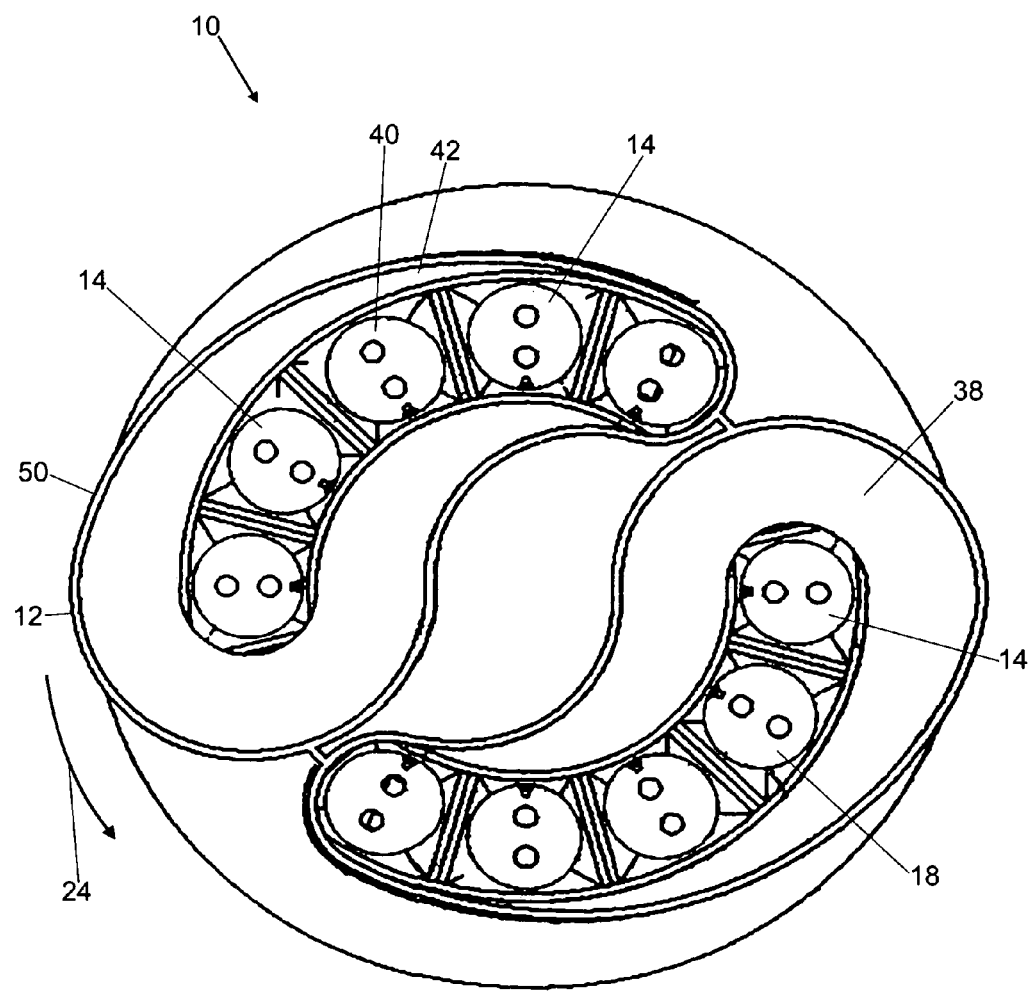
FIG. 3 illustrates an end view of an exemplary revolving supersonic nozzle looking into individual periodic combustion chambers.

FIG. 2 illustrates an isometric cutaway view of an exemplary multi-chamber periodic combustion propulsion system 10 with revolving supersonic exhaust nozzle 12. FIG. 3 illustrates an end view of an exemplary revolving supersonic nozzle looking into individual detonation chambers, (or simply periodic combustion chambers) 14. Referring to FIGS. 2 and 3, the periodic combustion propulsion system 10 illustrated comprises twelve (ten shown), periodic combustion chambers 14, and can optionally have two or more. Each chamber 14 is tubular in shape and elongated. The multiple chambers 14 are identical and arranged parallel to one another and centered upon a circumferential centerline 16 of the nozzle 12. Each periodic combustion chamber 14 operates periodically and the operation of each chamber is staggered with respect to one another. The periodic operation of a second chamber 18 acts to limit the expansion of a supersonic exhaust flow generated from a first chamber 14 as a consequence of the staggered operation of the two adjacent devices. The supersonic exhaust nozzle 12 is attached to a revolving mounting plate 20 attached to a shaft 22. The direction of revolution is shown as arrow 24. The shaft 22 is coupled to a Propellant Manifold Valve Assembly (PMVA) 26. It is contemplated that a motor (not shown) can drive the shaft 22 or a small amount of pressure can be bled off the periodic combustion chambers 14 through pressure taps 28 using periodic exhaust energy to drive a turbine (not shown), which would in turn act to spin the mounting plate 20. The PMVA 26 acts as a propellant delivery system to the periodic combustion chambers 14. The purpose of the PMVA 26 is to deliver propellant (not shown) from a source (not shown) to the periodic combustion chambers 14 in a timed and sequential manner. It is contemplated that although the PMVA 26 is depicted as a stationary fixed entity including multiple sets of oxidizer and fuel lines 30, the PMVA 26 system may consist of a revolving valve (not shown) that replaces the individual oxidizer lines and fuel lines 30 with a single set or another suitable arrangement. Furthermore, the PMVA 26 revolution can be coupled to the revolution of the supersonic exhaust nozzle 12. In order for the supersonic exhaust nozzle 12 to serve at least one of the intended purposes of improving the available thrust of the overall engine, alignment of the supersonic exhaust nozzle 12 with the periodic combustion chambers 14 at a given instant of time throughout its revolution must be maintained. To achieve proper synchronization, a mechanical or electrical coupling exists between the supersonic exhaust nozzle 12 and the PMVA 26 via the shaft 22 and mounting plate 20. The shape of the supersonic exhaust nozzle 12 can be such that exhausting gases acting tangentially upon an end 32 of the nozzle 12 can be used to achieve the revolution and synchronization. Furthermore, a rotor 34 attached to the drive shaft 22 can act to close a circuit, which serves to engage individual igniters in each periodic combustion chamber 14 in order to achieve synchronization between the supersonic exhaust nozzle 12 and periodic combustion chamber 14 firings. Nozzle 12 revolution frequency can be maintained through the use of a controller (not shown) attached to the main shaft 22 that provides feedback to the drive motor (not shown). Additional means of accomplishing the synchronization and revolution are possible and are within the scope of the disclosure. The combined revolution of the PMVA 26 and the supersonic exhaust nozzle 12 comprise the overall periodic combustion propulsion system 10. It is contemplated that the propellant source can either be in the form of separate tanks (not shown) containing oxidizer and fuel in either liquid, or gas phase or an air scoop (not shown) can be implemented to replace the oxidizer tank. Other propellant delivery methods, including solid propellant systems where oxidizer and fuel are pre-burned prior to injection into the periodic combustion chamber 14 are also possible.

Still referring to FIGS. 2 and 3, in one embodiment, the supersonic exhaust nozzle 12 is of non-constant cross sectional exit area at the nozzle discharge (or outlet) 38, such that optimal expansion of exhaust gases is achieved for every chamber at any instant in time throughout the fundamentally transient operation of the periodic combustion propulsion system 10. Optimal expansion is assumed to have been achieved when the supersonic exhaust's stagnation pressure matches the ambient pressure surrounding the nozzle 12. The supersonic exhaust nozzle 12 includes an inlet 40 coupled to a side wall 42. The inlet 40 is of constant cross-sectional inlet area to match the exit cross-sectional area of an exhaust port 44 of the periodic combustion chamber 14. The matching of the inlet 40 with the identically shaped exhaust port 44 of the periodic combustion chambers 14 ensures that the flow of hot combustion gases occurs through a choked point. The sonic choking of the exhaust flow occurs at the nozzle throat 46. Flow expansion of the gases through the choked point causes the flow of hot gases to achieve supersonic flow velocities in the supersonic exhaust nozzle 12 permitting the extraction of kinetic energy from thermal energy. The supersonic exhaust nozzle 12 is of larger cross-sectional exit area in the vicinity directly above the periodic combustion chamber 14 currently completing ignition of it's propellant charge (see FIG. 3). The exhaust expansion ratio, defined as the ratio of the nozzle exit cross-sectional area to the cross-sectional area of the nozzle throat, is optimized in order to generate maximum thrust. The supersonic exhaust nozzle 12 is of smaller cross-sectional exit area in the vicinity directly above a periodic combustion chamber 14 that has ignited previously and that has exhausted the majority of its combustion products. The supersonic exhaust nozzle 12 is of smallest cross-sectional exit area in the vicinity directly above a periodic combustion chamber 14 that has ignited previously, that has exhausted nearly all of its combustion products and that has recently begun the fueling process. The onset of fueling at this stage serves the additional purpose of sweeping out the remainder of the combustion gases. It will be appreciated that the remaining combustion gases may be hot enough to cause premature ignition of the new propellant charge and that at this stage a purge gas, for example nitrogen, can be injected to sweep out the remaining combustion gases. The supersonic exhaust nozzle 12 terminates in the vicinity directly above a periodic combustion chamber 14 that is currently near the end of its fueling phase to ensure that the fresh charge does not escape the periodic combustion chamber 14 prior to the ignition of the propellant mixture. It is possible that without the method of blocking the periodic combustion chamber 14 throughout the later half of the fueling phase, propellant may escape the detonation chambers if the nozzle backpressure is at or near a vacuum such as exists in the upper Earth atmosphere and space. By closing the open end of the periodic combustion chamber 14 during the fueling phase, a propellant charge can be delivered to the periodic combustion chamber 14 when the supersonic exhaust nozzle 12 backpressure is at a near or perfect vacuum condition without any propellant loss. It will be appreciated that although the supersonic exhaust nozzle 12 is depicted as being curvilinear in shape that other shapes are possible (e.g., planar, axi-symmetric and the like), and are within the scope of the disclosure. It will be appreciated that the supersonic exhaust nozzle 12 length can be variable to reduce material costs or to improve the design and operability of the device.

In another embodiment, an inner wall 48 of the supersonic exhaust nozzle 12 can be stationary and an outer wall 50 revolved in order to achieve the optimal expansion of the exhausting supersonic gases. In a similar manner, the exterior wall 50 of the supersonic exhaust nozzle 12 can be stationary and the inner wall 48 revolved in order to achieve the same optimal expansion of the exhausting supersonic gases.

Referring to FIG. 2, in another embodiment, the supersonic exhaust nozzle 12 is attached to a revolving mounting plate 20. Roller bearings 52 are positioned between the revolving mounting plate 20 and the assembly of rigid periodic combustion chambers 14. The bearings 52 allow the mounting plate 20 to revolve during operation. Thrust forces generated upon the supersonic exhaust nozzle 12 as a consequence of the detonation process within the periodic combustion chambers 14 are transferred via the bearings 52 to the vehicle body (not shown) during operation of the periodic combustion propulsion system 10. A second, distinct set of bearings 54, exists between the PMVA 26 and the assembly of rigid periodic combustion chambers 14. The bearings 54 allow the transfer of the same thrust forces from the PMVA 26 to the vehicle body (not shown) during operation of the periodic combustion propulsion system 10. A set of gas seals 56 positioned between the revolving mounting plate 20 and the periodic combustion chambers 14 blocks the leakage of exhaust gases and new propellant charge. It will be appreciated that the igniter 36 may be in the form of a spark plug or other incendiary device, and is positioned in close proximity to the inlet of each periodic combustion chamber 14.

Figure 4:
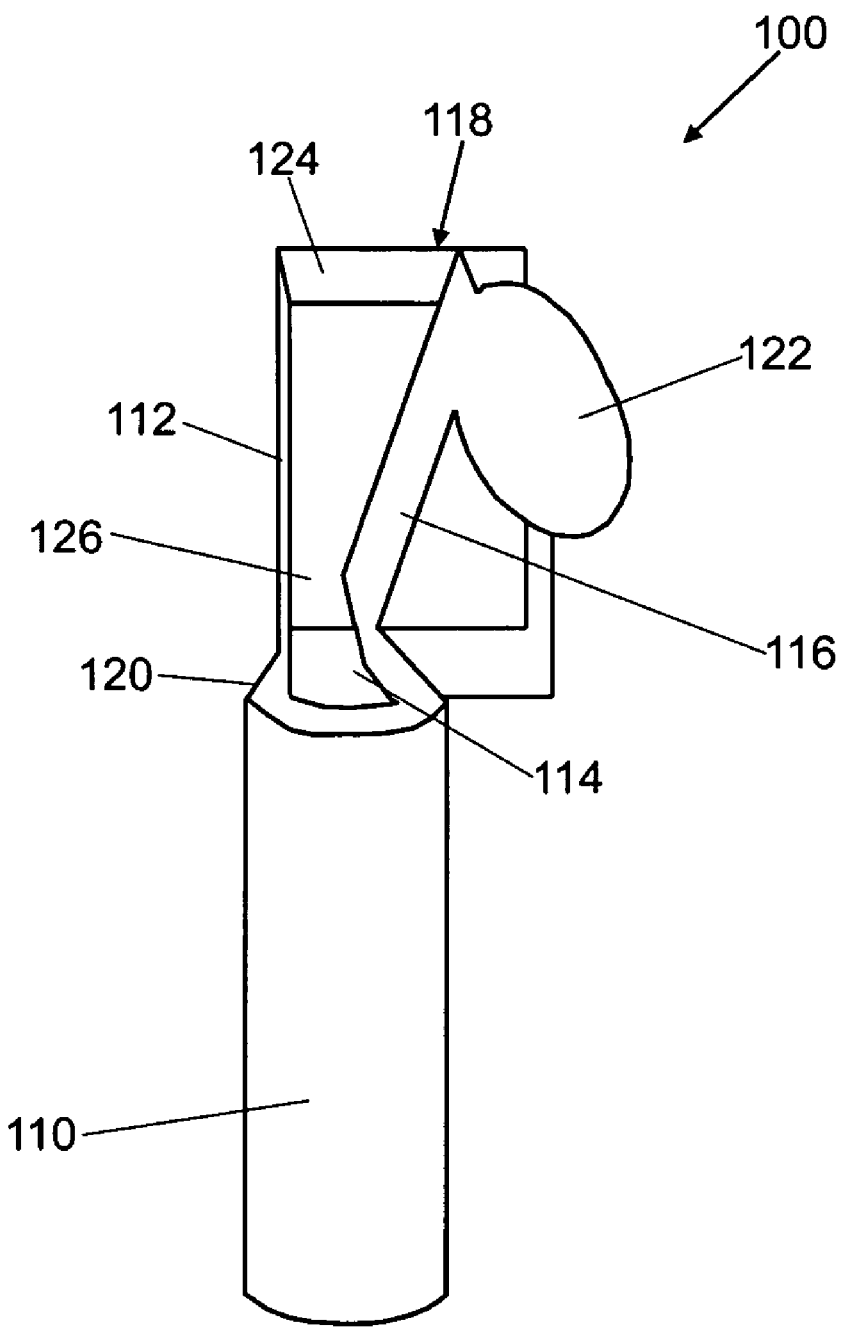
FIG. 4 illustrates another embodiment of an exemplary periodic combustion propulsion system for use with a single periodic combustion chamber.

FIG. 4 illustrates another embodiment of an exemplary periodic combustion propulsion system 100 for use with a single periodic combustion chamber 110. A supersonic exhaust nozzle 112 includes an inlet 114 coupled to a flexible side wall 116. The inlet 114 is fluidly coupled to an outlet 118. The outlet 118 is coupled to the flexible side wall 116 distal from the inlet 114. The periodic combustion chamber 110 is coupled to the supersonic exhaust nozzle 112 at a location proximate to an exhaust port 120 of the periodic combustion chamber 110. The flexible side wall 116 and the outlet 118 of the supersonic exhaust nozzle 112 have variable dimensions correlated to periodic combustion in the periodic combustion chamber 110. The flexible side wall 116 dimensions vary in response to mechanical deflection. The optimal expansion of exhaust gases leaving a single periodic combustion chamber 110 can also be accomplished by means of a deflection member 122, (or similar device). The deflection member can be a revolving cam, which serves to vary the contour of the supersonic exhaust nozzle 112 by flexing the flexible side wall 116. Consequently an exit plane area 124 throughout the transient blowdown of the periodic combustion chamber 110 can periodically vary. The nozzle throat area 126 can also vary periodically or remain fixed. Affecting the outlet 118 of the supersonic exhaust nozzle 112 with the deflection member 122 allows adjustment of both contour (nozzle shape) and exit plane area 124, both of which are necessary in order to achieve optimal expansion. Revolution of the (cam), deflection member 122 can be accomplished via a coupling to a drive shaft (not shown). Synchronization of the deflection member 122 with the firing of the periodic combustion chamber 110 can be accomplished via a rotor (not shown) attached to the drive shaft acting to close a circuit, which serves to engage individual igniters (not shown) in each periodic combustion chamber 110.

Figure 5:
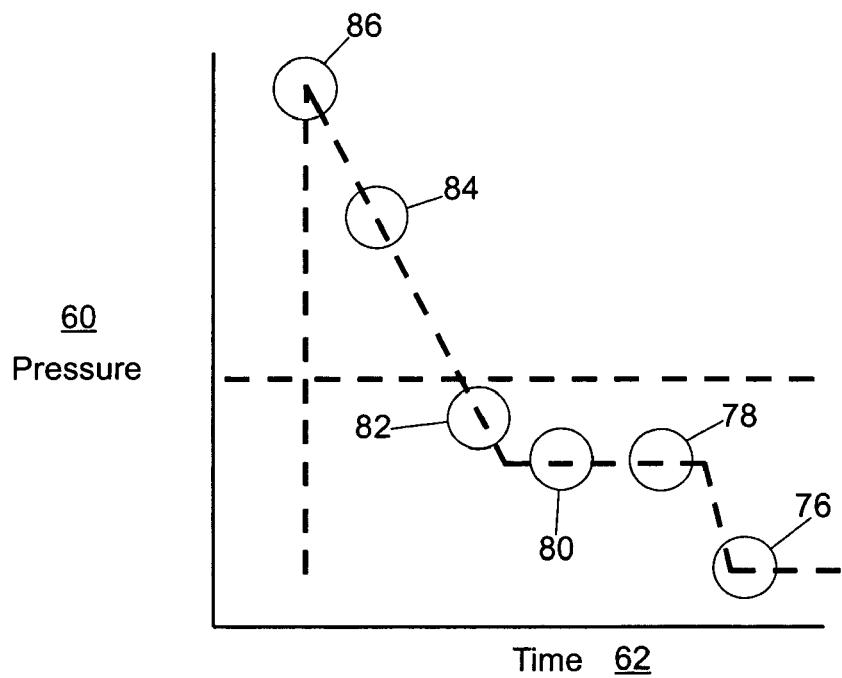
FIG. 5 illustrates a schematic of the probable form for the pressure as a function of time expected within a single periodic combustion chamber during the course of a single detonation.
Figure 6:
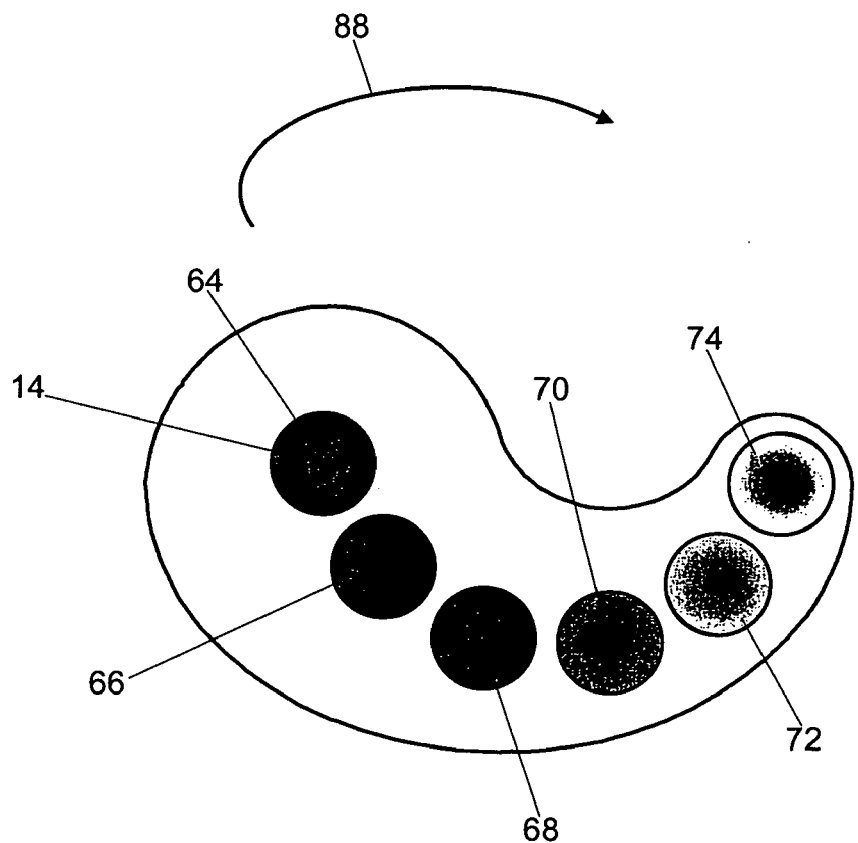
FIG. 6 illustrates a graph of the probable form for the pressure as a function of time expected within a single periodic combustion chamber during the course of a single detonation.

FIG. 5 illustrates a graph and FIG. 6 illustrates a schematic of the probable form for the pressure as a function of time expected within a single periodic combustion chamber 14 during the course of a single detonation. For a given instant in time during the steady operation of the periodic combustion propulsion system 10, FIG. 5 illustrates the variability of the pressure 60 within any given detonation chamber over time 62, underpinning the necessity of having a variable contour and cross-sectional area nozzle 12. FIG. 6 depicts six of the twelve periodic combustion chambers 14, where the second six have not been included in the Figure as a consequence of the symmetry of the engine construction and operation. Two periodic combustion chambers 14 out of the twelve depicted within the preferred embodiment initiate detonation simultaneously. In FIG. 6, onset of detonation has occurred in the sixth chamber 64 whereas the remaining chambers 66, 68, 70, 72, and 74 initiated detonation previously in sequential order. The charge in the first periodic combustion chamber in the sequence 74 was ignited first, followed by the second chamber 72, followed by the third combustion chamber 70, followed by the fourth combustion chamber 68, followed by the fifth combustion chamber 66 and followed last by the sixth combustion chamber 64. The pressure in each of the periodic combustion chambers at a particular instant in time is shown in FIG. 5. The first periodic combustion chamber 74 in the sequence corresponds to pressure one 76, the second periodic combustion chamber 72 corresponds to pressure two 78, the third periodic combustion chamber 70 corresponds to pressure three 80, the fourth periodic combustion chamber 68 corresponds to pressure four 82, the fifth periodic combustion chamber 66 corresponds to pressure five 84 and the sixth periodic combustion chamber 64 corresponds to pressure six 86. The direction of revolution 88 of the nozzle 12 as well as the direction of successive detonations is indicated in FIG. 6. The revolving nozzle 12 possesses variable cross sectional exit area and a contour that allows exhaust gases to optimally expand from a periodic combustion chamber 14 while accomplishing the same for a periodic combustion chamber that has recently fired 66, 68, 70, 72, and 74. The position of the nozzle 12 is matched to the firing of the periodic combustion chambers via a mechanical or electrical coupling (not shown) that exists between the nozzle 12 and the PMVA 26 via the shaft 22 and mounting plate 20. The overall effect is optimal, or near optimal expansion throughout the detonation transient for the exhaust gases leaving every single periodic combustion chamber.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A periodic combustion propulsion system comprising:
   at least one periodic combustion chamber configured to contain periodic combustion;
   at least one supersonic exhaust nozzle coupled to said at least one periodic combustion chamber, said at least one supersonic exhaust nozzle configured with a physical exit area that varies in a circumferential direction to provide a variable exhaust expansion ratio; and a second periodic combustion chamber adjacent said at least one periodic combustion chamber, said second periodic combustion chamber having exhaust, said at least one periodic combustion chamber having a supersonic exhaust flow, said exhaust of said second periodic combustion chamber limits expansion of said supersonic exhaust flow of said at least one periodic combustion chamber, wherein said at least one supersonic exhaust nozzle is fluidly coupled in sequence to said at least one periodic exhaust chamber and said second periodic exhaust chamber.

2. The periodic combustion propulsion system of claim 1 wherein said at least one supersonic exhaust nozzle is configured with a varying nozzle geometry, wherein said varying nozzle geometry is directly correlated to periodic combustion pressure of said at least one combustion chamber.

3. The periodic combustion propulsion system of claim 1 wherein said at least one supersonic exhaust nozzle includes an inlet coupled to at least one side wall and an outlet coupled to said at least one side wall distal from said inlet.

4. The periodic combustion propulsion system of claim 1 wherein said at least one supersonic exhaust nozzle is configured to seal said at least one periodic combustion chamber during a fueling phase.

5. The periodic combustion propulsion system of claim 1 wherein said supersonic exhaust nozzle is configured to seal said at least one periodic combustion chamber during a fueling phase in the abscence of nozzle back-pressure.

6. The periodic combustion propulsion system of claim 1 wherein said at least one supersonic exhaust nozzle is configured to revolve relative to said at least one periodic combustion chamber.

7. The periodic combustion propulsion system of claim 1 further comprising: a synchronization element operatively coupled to said at least one supersonic exhaust nozzle, said synchronization element is configured to actively maintain said supersonic exhaust nozzle in synchronization with said periodic combustion.

8. A periodic combustion propulsion system comprising:
   a periodic combustor including a combustion chamber having an exhaust port and an inlet valve, said exhaust port coupled to a combustor mounting plate; and
   a supersonic exhaust nozzle configured with a variable exhaust expansion ratio, said supersonic exhaust nozzle including a body having at least one rigid side wall defining an inlet and a discharge opposite said inlet, said supersonic exhaust nozzle including a nozzle mounting plate proximate to said inlet, said nozzle mounting plate being rotatably coupled to said combustor mounting plate wherein said supersonic exhaust nozzle is configured for rotary coupling with said periodic combustor.

9. The periodic combustion propulsion system of claim 8 wherein said discharge of said rigid side wall is configured to utilize energy from exhausting propellant to rotate at least one of said periodic combustor and said supersonic exhaust nozzle.

10. The periodic combustion propulsion system of claim 8 wherein said rigid side wall configured with variable contours and variable cross-sectional area allowing supersonic exhaust to expand to ambient pressure as the supersonic exhaust discharge of said rigid wall, wherein said supersonic exhaust is supplied to said discharge of said rigid wall from at least one of a periodic combustor recently fired and another periodic combustor that is presently firing.

\* \* \* \* \*